(12) United States Patent
Kim et al.

(10) Patent No.: US 8,576,469 B2
(45) Date of Patent: Nov. 5, 2013

(54) LIGHT SCREENING APPARATUS INCLUDING ROLL-UP ACTUATORS

(75) Inventors: Che-heung Kim, Yongin-si (KR); Seog-woo Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 938 days.

(21) Appl. No.: 12/692,285

(22) Filed: Jan. 22, 2010

(65) Prior Publication Data

US 2010/0290101 A1 Nov. 18, 2010

(30) Foreign Application Priority Data

May 13, 2009 (KR) .................. 10-2009-0041855
Aug. 10, 2009 (KR) .................. 10-2009-0073359

(51) Int. Cl.
*G02B 26/02* (2006.01)

(52) U.S. Cl.
USPC ........................................ 359/230; 359/904

(58) Field of Classification Search
USPC .................. 359/227, 230–231, 601
See application file for complete search history.

(56) References Cited

U.S. PATENT DOCUMENTS

| | | | |
|---|---|---|---|
| 3,989,357 A | 11/1976 | Kalt | |
| 4,235,522 A | 11/1980 | Simpson et al. | |
| 4,266,339 A | 5/1981 | Kalt | |
| 5,233,459 A | 8/1993 | Bozler et al. | |
| 5,605,609 A | 2/1997 | Ando et al. | |
| 5,781,331 A | 7/1998 | Carr et al. | |
| 5,847,454 A | 12/1998 | Shaw et al. | |
| 5,959,763 A | 9/1999 | Bozler et al. | |
| 6,067,183 A | 5/2000 | Furlani et al. | |
| 6,443,637 B1 | 9/2002 | Dowe | |
| 6,594,058 B2 | 7/2003 | Flanders | |
| 6,972,889 B2 | 12/2005 | Goodwin-Johansson et al. | |
| 7,766,563 B2 | 8/2010 | Wakabayashi | |
| 2003/0203237 A1 | 10/2003 | Webb et al. | |
| 2004/0046123 A1 | 3/2004 | Dausch | |
| 2006/0196613 A1 | 9/2006 | Lamontagne et al. | |
| 2007/0279558 A1 | 12/2007 | Chang | |
| 2009/0142050 A1 | 6/2009 | Kim et al. | |

FOREIGN PATENT DOCUMENTS

| | | |
|---|---|---|
| EP | 1 008 885 A1 | 6/2000 |
| EP | 1 241 508 A2 | 9/2002 |
| EP | 1241507 A2 | 9/2002 |

(Continued)

OTHER PUBLICATIONS

Extended European Search Report issued on Sep. 10, 2010 in counterpart European Application No. 10155823.7.

(Continued)

*Primary Examiner* — Stephone Allen
*Assistant Examiner* — Tamara Y Washington
(74) *Attorney, Agent, or Firm* — Sughrue Mion, PLLC (57) ABSTRACT

There are provided a light screening apparatus and a manufacturing method thereof. The light screening apparatus includes a substrate, a transparent electrode, a plurality of roll-up actuators and a plurality of light screening patterns. The substrate includes a light-transmitting region and the transparent electrode is formed on one surface of the substrate. Each roll-up actuator, which has opaque characteristics, is fixed on the circumference portion of the light-transmitting region and includes a fixing end and a moving part which extends from the fixing end. Gaps are formed between adjacent roll-up actuators, and the light screening patterns are formed on the substrate at locations corresponding to the gaps. The light-screening patterns prevent light incident through the gaps from being transmitted to the light-transmitting region.

18 Claims, 9 Drawing Sheets

(56) References Cited

FOREIGN PATENT DOCUMENTS

| | | |
|---|---|---|
| JP | 08-220592 A | 8/1996 |
| JP | 11-167078 A | 6/1999 |
| JP | 2008-040006 A | 2/2008 |
| KR | 1998-016031 A | 5/1998 |
| KR | 10-2009-0055996 A | 6/2009 |
| WO | 89/01217 A1 | 2/1989 |

OTHER PUBLICATIONS

Extended European Search Report, dated Aug. 6, 2012, issued by the European Patent Office in counterpart European Application No. 11193763.7.

U.S. Appl. No. 13/230,058, filed Sep. 12, 2011, Che-Heung Kim.

U.S. Appl. No. 13/451,273, filed Apr. 19, 2012, Seog-woo Hong.

U.S. Appl. No. 12/907,236, filed Oct. 19, 2010, Seog-woo Hong.

LIGHT SCREENING APPARATUS INCLUDING ROLL-UP ACTUATORS

CROSS-REFERENCE TO RELATED APPLICATION

This application claims the benefit under 35 U.S.C. §119(a) of Korean Patent Applications No. 10-2009-41855, filed on May 13, 2009, and No. 10-2009-73359, filed on Aug. 10, 2009, the disclosures of which are incorporated by reference in its entirety for all purposes.

BACKGROUND

1. Field

The following description relates to an optical device, and more particularly, to a light screening device and a manufacturing method thereof

2. Description of the Related Art

A light screening apparatus is a common feature of apparatuses which require the prevention of light transmission. An optical shutter, which is a kind of light screening apparatus, is an optical device which allows transmission of light only during a specific time interval. For example, an optical shutter embedded in a camera module blocks or allows the passage of light passing through a camera lens. By changing a driving speed of the optical shutter and/or varying a range of screening the camera lens (i.e. an opening size of the optical shutter), the optical shutter may be used to adjust a time at which light to be transmitted to an image sensor is received and/or the received amount of light. The light screening apparatus, e.g. an optical shutter, is also used for any other optical devices requiring a temporary, selective or permanent light-screening function, as well as for camera modules.

Following on from mechanical optical shutters, electronic optical shutters have been developed. An electronic optical shutter controls a time interval during which an image sensor receives light by turning on/off the image sensor. Since the electronic optical shutter operates by use of a circuit, it has been widely used for digital cameras having limitations in camera module size. However, using such an electronic optical shutter, and due to the increased number of pixels of a camera module, moving object distortion may easily occur.

Recently, with the ever increasing number of pixels of a digital camera embedded in a mobile device, interest for a mechanical optical shutter is again increasing. Due to requirements for small-sized, thin electronic devices, the mechanical optical shutter also needs to be small-sized and thin. Also, light passing through a camera lens has to be completely blocked when the mechanical optical shutter is closed, and when the mechanical optical shutter is opened, light passing through the camera lens has to be uninterrupted. In addition, in order to support a high-definition, high-performance camera module, the mechanical optical shutter has to provide a very quick response (shuttering) speed.

SUMMARY

The following description relates to a light screening apparatus having a small size and a low thickness which is capable of achieving a high response speed, and a manufacturing method thereof.

The following description also relates to a light screening apparatus which can block light completely when it is closed and through which a sufficient amount of light can pass when it is opened, and a manufacturing method thereof.

According to one exemplary aspect, there is provided a light screening apparatus including a substrate, a transparent electrode, a plurality of roll-up actuators and light screening patterns. The substrate includes a light-transmitting region and the transparent electrode is formed on one surface of the substrate. Each roll-up actuator, which is opaque, is fixed on the circumference portion of the light-transmitting region and includes a fixing end and a moving part which extends from the fixing end. Gaps are formed between adjacent roll-up actuators, and the light screening patterns are formed on the substrate at locations corresponding to the gaps.

According to another exemplary aspect, there is provided another light screening apparatus including a substrate, a transparent electrode, a plurality of roll-up actuators and light screening patterns. The substrate includes a light-transmitting region which is in the form of a circle or a polygon. The transparent electrode is formed on one surface of the substrate. The roll-up actuators, which are opaque, are formed over the substrate and are arranged in a radial shape, extending from a center of the light-transmitting region and fixed fixed on the circumference portion of the light-transmitting region, to individually cover corresponding areas of the light-transmitting region, and the light screening patterns are formed on the substrate in correspondence to gaps between adjacent roll-up actuators.

According to another exemplary aspect, there is provided another light screening apparatus including a substrate, a transparent substrate and a plurality of roll-up actuators. The substrate includes a light-transmitting region. The transparent electrode is formed on one surface of the substrate. The roll-up actuators, which are opaque, are formed over the substrate while being fixed on an edge portion of the light-transmitting region, to individually cover corresponding areas of the light-transmitting region. Each roll-up actuator is composed of a moving part and a fixing end, the fixing end is fixed on the edge portion of the light-transmitting region, and moving parts of the roll-up actuators are connected to one another near the fixing ends so that the roll-up actuators are all driven together.

According to another exemplary aspect, there is provided a method of manufacturing a light screening apparatus. In the method, a transparent electrode is formed on a substrate having a light-transmitting region. Then, a sacrificial layer is formed on a portion of the substrate including the light-transmitting region. Next, a plurality of roll-up actuators, which are separated from each other by gaps, are formed on the substrate and the sacrificial layer, and then the portions of the sacrificial layer exposed by the gaps are etched. Then, light screening patterns are formed on the substrate exposed by etching the sacrificial layer and the remaining sacrificial layer is entirely removed.

Other objects, features and advantages will be apparent from the following description, the drawings, and the claims.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

Figure 1:
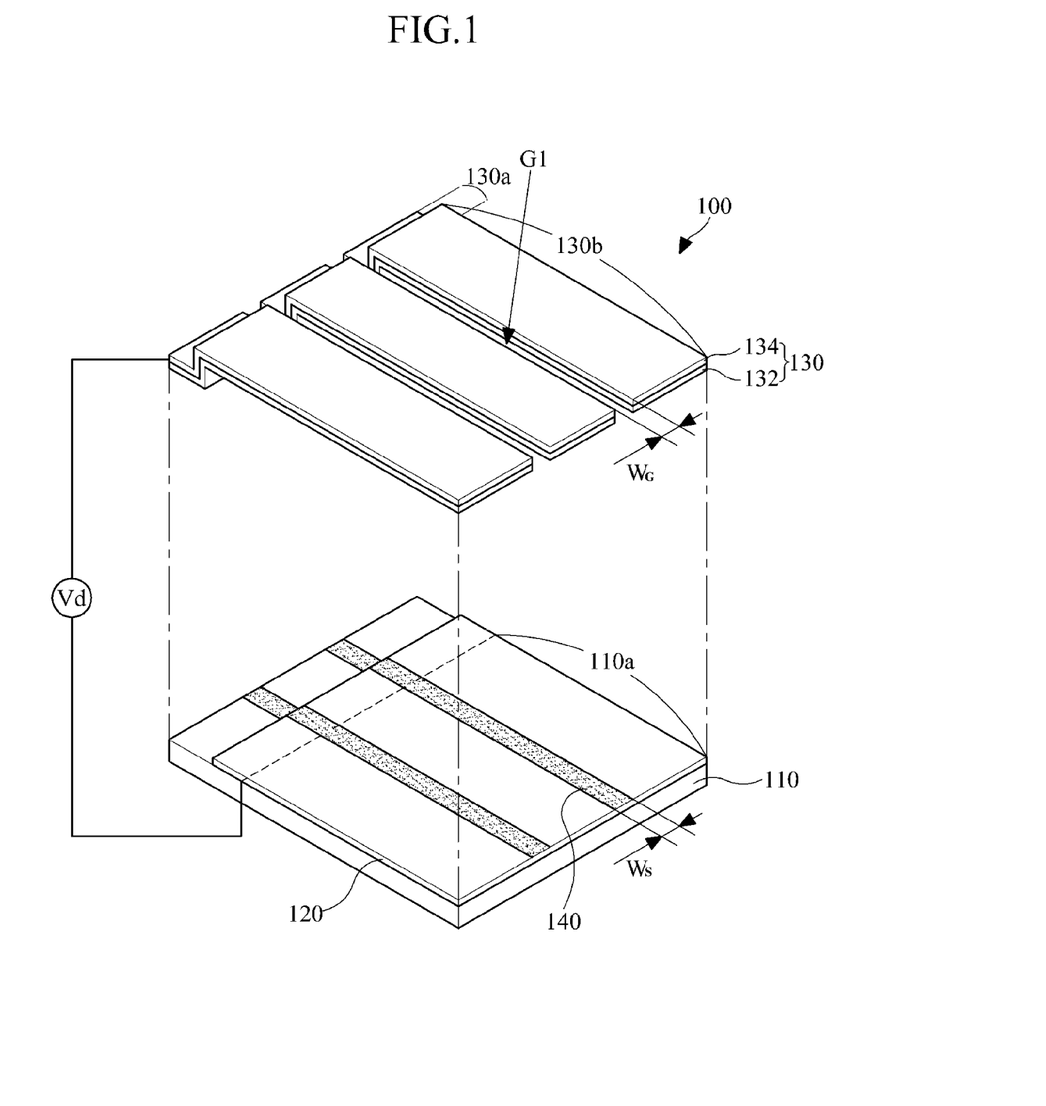
FIG. 1 is a perspective view of an exemplary light screening apparatus when blocking light.
Figure 2:
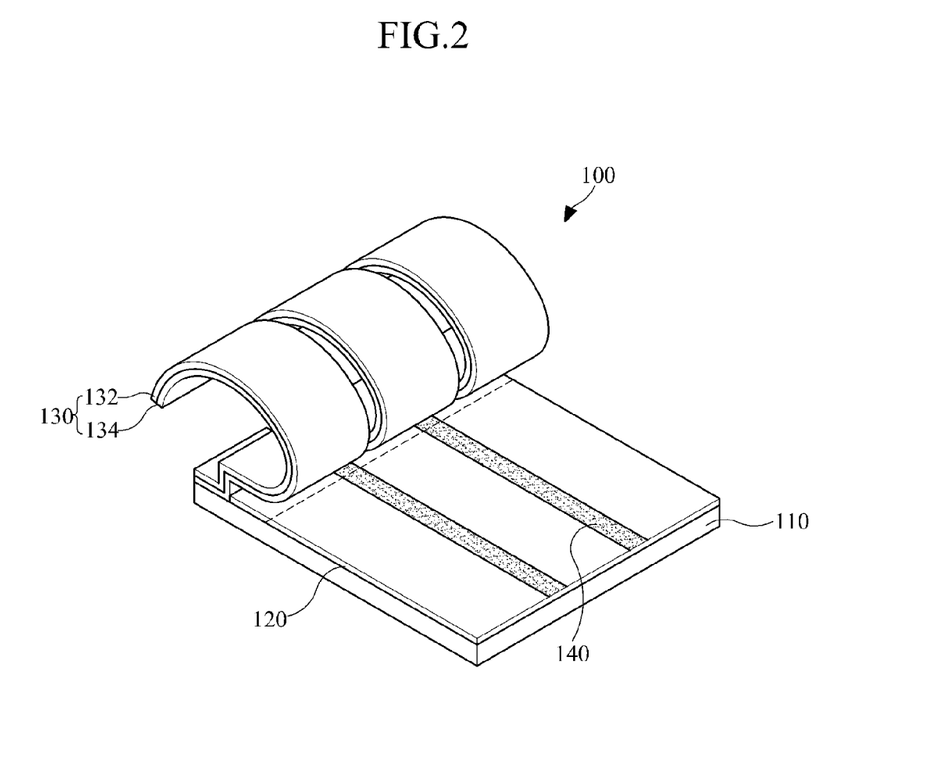
FIG. 2 is a perspective view of the light screening apparatus illustrated in FIG. 1, when passing light therethrough.

FIGS. 1 are 2 are perspective views showing the configuration of an exemplary light screening apparatus 100. The light screening apparatus 100 may itself be a single light screening apparatus or may be a part of another light screening apparatus (see FIG. 4). The state illustrated in FIG. 1 corresponds to when the light screening apparatus 100 is driven to block light, wherein a substrate 110 and a roll-up actuator 130 are, for convenience of description, shown to be separated from each other. The state illustrated in FIG. 2 corresponds to when the light screening apparatus 100 passes light. Referring to FIGS. 1 and 2, the light screening apparatus 100 includes the substrate 110, a transparent electrode 120, the roll-up actuator 130 and light screening patterns 140.

The substrate 110 includes a light-transmitting region 110a. The light-transmitting region 110a passes light when the roll-up actuator 130 is rolled up (see FIG. 2), and is covered by the roll-up actuator 130 when the roll-up actuator 130 is driven and flattened (the term "flattened" is used in the description to have the same meaning as the terms "unrolled" and "rolled out", which are also used in the description). For example, if the light screening apparatus 100 is an optical shutter of a camera module, the location of the light-transmitting region 100a of the substrate 110 may correspond to that of a lens, and light passed through the light-transmitting region 110a is incident to an image sensor via the lens. The light-transmitting region 110a may be manufactured in an arbitrary shape which includes a square, a circle, an oval and a polygon. Outside one side of the light-transmitting region 110a, an opaque part through which no light can pass may be provided, which is not shown in the drawings.

The substrate 110 may be wholly made of a transparent material, or a part of the substrate 110 including the light-transmitting region 110a may be made of a transparent material. The substrate 110 may be a glass substrate, but is not limited to this. That is, the substrate 110 may be formed of any other transparent material, such as quartz, plastic, silica and the like.

On one surface of the substrate 110, a transparent electrode 120 is formed. The transparent electrode 120 may be made of a transparent conductive material, for example, Indium Tin Oxide (ITO), ZnO, $SnO_2$, CNT, conductive polymer, etc. The transparent electrode 120 is connected to a driving power supply to drive the light screening apparatus 100, particularly, the roll-up actuator 130.

The transparent electrode 120 may be formed on the entire surface of the light-transmitting region 110a, or may be formed with a predetermined pattern in the light-transmitting region 110a. In order to quickly drive the light screening apparatus 100 by increasing driving power, the transparent electrode 120 may be formed on the entire area corresponding to the light-transmitting region 110a. However, the current embodiment is not limited to this structure, and the transparent electrode 120 may be formed only on a part of the light-transmitting region 110a or on all of the light-transmitting region 110a and its peripheral areas.

The roll-up actuator 130 stays in a rolled-up state when no driving voltage $V_d$ is applied to the transparent electrode 120 (see FIG. 2). In this state, the light-transmitting region 110a of the substrate 110 is exposed and incident light passes through the light-transmitting region 110a. Meanwhile, if a driving voltage $V_d$ is applied, the roll-up actuator 130 rolls out (see FIG. 1). In this state, the light-transmitting region 110a of the substrate 110 is screened by the roll-up actuator 130, so that incident light is blocked.

A plurality of roll-up actuators (each 130) may be provided. FIGS. 1 and 2 show three roll-up actuators (each 130), but the number of roll-up actuators used is not limited. Each roll-up actuator 130 is fixed by a fixing end 130a. As illustrated in FIG. 1, the roll-up actuator 130 may be fixed on one side of the substrate 110, that is, on one end of the light-transmitting region 110a. Alternatively, the fixing end 130a may be fixed on another structure, such as a spacer (not shown), formed at one side of the light-transmitting region 110a. The main part of the roll-up actuator 130, except for the fixing end 130a, is a moving part 130b which is flattened (rolled out) or rolled up depending on application of driving voltage.

The roll-up actuator 130 includes at least two thin film patterns stacked. For example, the thin film patterns may be an insulating layer 132 and an electrode layer 134 stacked on the insulating layer 132. In order for the roll-up actuator 130 to be opaque, at least one of the insulating layer 132 and electrode layer 134 is made of an opaque material. For example, the insulating layer 132 may be made of an insulating material, such as $SiO_2$ or $Si_3N_4$, and the electrode layer 134 may be made of an opaque metal, such as Chrome (Cr), Aluminum (Al), Aurum (Au), Molybdenum (Mo) or Copper (Cu).

In order for the moving part 130b of the roll-up actuator 130 to stay in a rolled-up state when no driving power is applied, the insulating layer 132 and electrode layer 134 have different residual stresses. In more detail, the electrode layer 134 may have a tensile residual stress, and the insulating layer 132 may have a compressive residual stress, no residual stress, or a tensile residual stress lower than that of the electrode layer 134.

Due to the difference in residual stress, the moving part 130b of the roll-up actuator 130 stays in a rolled-up state when no driving voltage is applied. Meanwhile, if a driving voltage is applied and thus driving power (attractive force) is caused between the transparent electrode 120 and the roll-up actuator 130 (specifically, the electrode layer 134), then the moving part 130b of the roll-up actuator 130 is rolled out to be flattened to screen the light-transmitting region 110a of the substrate 110. The driving force is not limited to electrostatic force formed between the transparent electrode 120 and electrode layer 134. For example, if a piezo-electrically driven pattern, instead of the electrode layer 134, is formed, piezoelectric force, instead of electrostatic force, is caused and can be used as the driving force to drive the moving part 130b of the roll-up actuator 130. Alternatively, according to another exemplary embodiment, magnetic power may serve as the driving power.

The plurality of roll-up actuators 130 may simultaneously operate to expose or screen the light-transmitting region 110a of the substrate 110. For example, if the driving voltage $V_d$ is simultaneously applied to the plurality of roll-up actuators 130, the rolled-up moving parts 130b of the roll-up actuators 130 are together flattened by electrostatic force caused between the transparent electrode 120 and the plurality of roll-up actuators 130, to thus screen the light-transmitting region 110a. Then, when the driving voltage $V_d$ is no longer applied, the respective moving parts 130b of the roll-up actuators 130 again return to be in the rolled-up state.

According to another exemplary embodiment, it is possible to apply the driving voltage $V_d$ to the roll-up actuators 130, respectively, to individually control the roll-up actuators 130, or to apply the driving voltage $V_d$ individually to the roll-up actuators 130 at different times or apply the driving voltage $V_d$ to several groups of the roll-up actuators 130 at different times. Alternatively, like a camera aperture, it is possible to differentiate a degree to which the roll-up actuators 130 are unrolled into several levels. In this case, the exposed area of the light-transmitting region 110a may depend on a level to which the roll-up actuators 130 are unrolled.

The roll-up actuators 130 are separated by a predetermined width $W_G$ of gap G1 from each other (see FIG. 1). That is, there is a gap G1 between two neighboring roll-up actuators 130. The width $W_G$ of the gap G1 is not limited, but may be set properly in consideration of the function of the light screening pattern 140. As illustrated in FIG. 1, the gap $G_1$ may be formed along the longitudinal direction of the roll-up actuators 130. Alternatively, the gap G1 may be formed throughout the whole length of the moving parts of the roll-up actuators 130 along the longitudinal direction of the moving parts. In this case, the width $W_G$ of the gap G1 may be not uniform.

Since the roll-up actuators 130 are separated by the gap G1 from each other, each roll-up actuator may be not influenced by movements of its neighboring roll-up actuators when the roll-up actuators 130 are unrolled or rolled up. Furthermore, air can be easily discharged through the gap $G_1$ when the roll-up actuators 130 are driven, so that squeeze film damping can be prevented.

Figure 3:
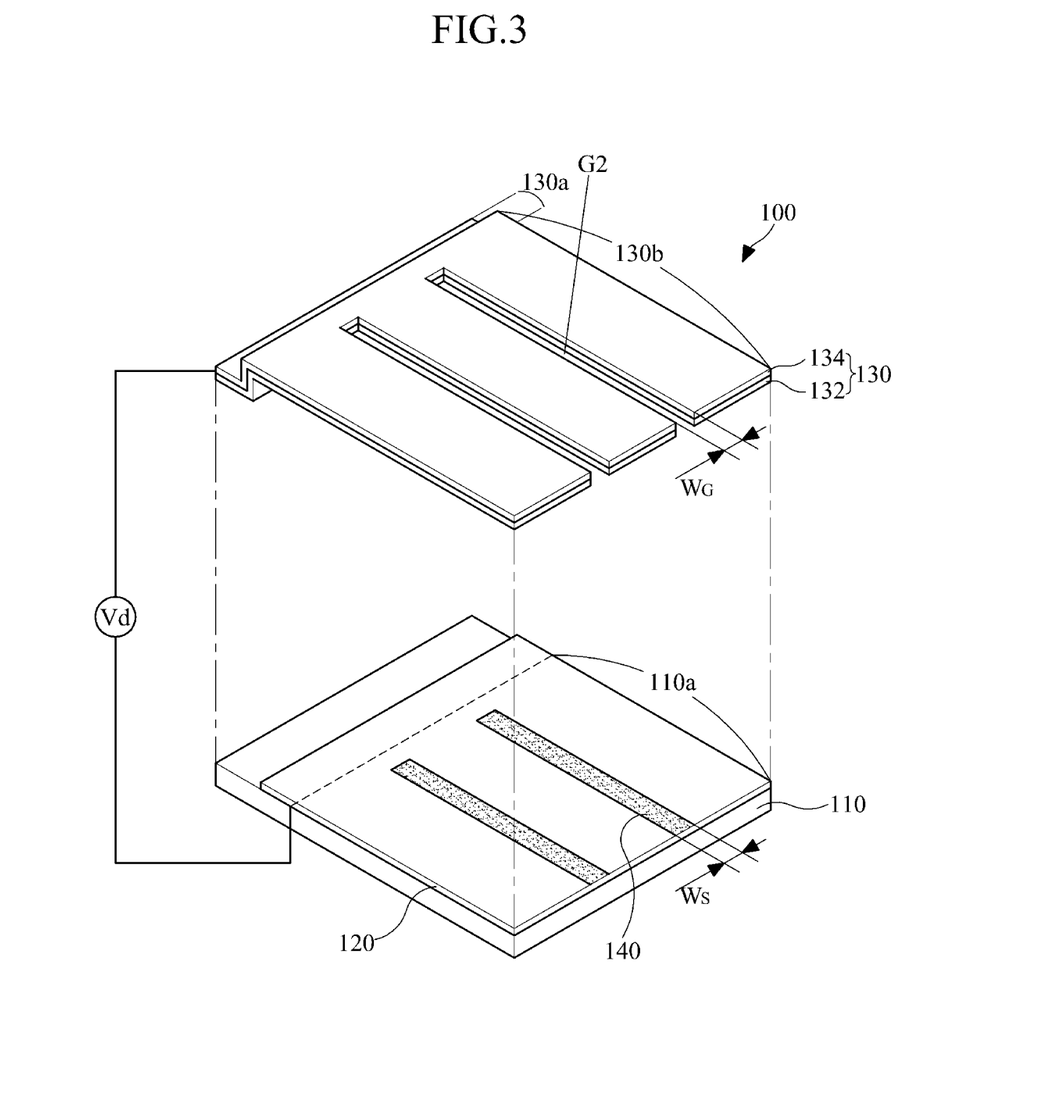
FIG. 3 shows a modified example of the light screening apparatus illustrated in FIG. 1.

FIG. 3 shows a modified example of the light screening apparatus illustrated in FIG. 1, wherein a gap G2 which has a different form to the gap G1 of FIG. 1 is included in the roll-up actuator 130. Referring to FIG. 3, the gap G2 is not formed throughout the whole length of the moving parts 130b, but is only formed in a portion of the moving part 130b. In more detail, the gap G2 is only formed up to a predetermined distance from the fixing end 130a of the roll-up actuator 130. The remaining part of the moving part 130b near the fixing end 130a is formed as one body having no gap.

The roll-up actuators 130 may have undesirable driving characteristics when there are deviations in electrical or physical characteristics and the driving characteristics become worse when such deviations are serious. Additionally, while a driving voltage Vd is applied to the roll-up actuators 130, certain variations may occur. Such deviations or failures in electrical or physical characteristics occurring between the roll-up actuators 130 may restrict the performance of the light screening apparatus 100. However, as illustrated in FIG. 3, when a portion of the moving part 130b is integrated into one body having no gap, mechanical coupling is formed between neighboring roll-up actuators 130. Due to the mechanical coupling, the separated moving parts 130b of the roll-up actuators 130 may achieve simultaneous driving, quick driving, and uniform operation.

Again returning to FIGS. 1 and 2, the light screening apparatus 100 includes light screening patterns 140 that are formed at locations corresponding to the gaps G1 that separate the roll-up actuators 130. The light screening patterns 140 may be formed on the transparent electrode 120 or on the substrate 110 without the transparent electrode 120, or some portions of the light screening patterns 140 may be formed on the transparent electrode 120.

The light screening patterns 140 function to block light passing through the gaps G1 between the actuators 130 from being transmitting through the light-transmitting region 110a when the light screening apparatus 100 is closed (FIG. 1). For such light blocking, the light screening patterns 140 are made of an opaque material, for example, made of a metal material such as Cr or Al, or an insulating material such as silicon oxide and silicon nitride.

The optical blocking patterns 140 are formed on the substrate 110 at locations corresponding to the gaps $G_1$ between the actuators 130. In order for the gaps G1 to be formed at locations corresponding to the light screening patterns 140, various methods may be used. For example, in the case of forming the gaps G1 after forming the light screening patterns 140, a general alignment method may be used to align the gaps G1 with the light screening patterns 140. Alternatively, the light screening patterns 140 may be formed using Self Alignment Deposition (SAD). Here, SAD is deposition accompanied by photomasking. For example, a photomask used when patterning a material layer to form gaps G1 may be used as a mask pattern when depositing the light screening patterns 140. Alternatively, the actuators 130 separated by the gaps G1 themselves may be used as a mask through which the light screening patterns 140 are applied.

The light screening patterns 140 are large enough to screen light incident through the gaps G1 when the roll-up actuators 130 are flattened (see FIG. 1). For example, the width Ws of each light screening pattern 140 may be equal to or wider than the width $W_G$ of each gap G1. Also, the size of each light screening pattern 140 is appropriately set to be large enough to little influence the intensity or brightness of light passing through the light-transmitting region 110a of the substrate 110 when the light screening apparatus 100 is rolled up (see FIG. 2).

Accordingly, the width $W_G$ of each gap G1 between the roll-up actuators 130 and/or the width Ws of each light screening pattern 140 may be set in consideration of such characteristics. For example, if the width Ws of each light screening pattern 140 is set to about 4 μm or less, brightness deterioration or image distortion will occur slightly when the light screening apparatus 100 is rolled up. Also, if the width $W_G$ of each gap G1 between the roll-up actuators 130 is set to 1 μm or less, the suppressing of squeeze film damping is weakened. However, these proposed values are only exemplary, and may depend on the experiment condition or the relationship with other modules (a camera module, etc.).

In this way, in the light screening apparatus 100 according to the current embodiment, the moving part 130b of the roll-up actuator 130 is wholly or partially divided into a plurality of parts by gaps, and accordingly air between the substrate 110 and the roll-up actuators 130 can easily be moved away when light is blocked, which leads to quick shuttering. Also, since light screening patterns each having a predetermined width are formed at locations corresponding to the gaps, the light screening apparatus 100 may completely block incident light. In addition, since the moving part 130b near the fixing end 130a of the roll-up actuator 130 has no gap, uniform driving of the roll-up actuator 130 is achieved and shuttering speed increases.

Figure 4:
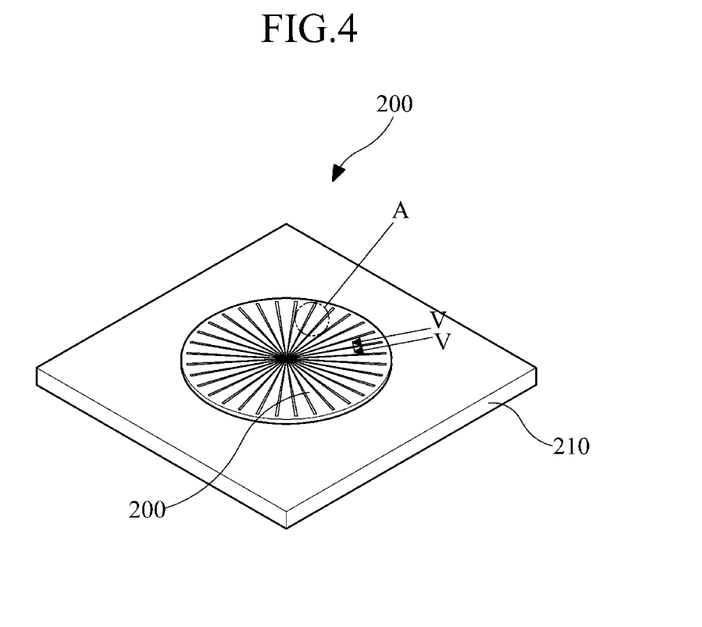
FIG. 4 is a perspective view of another exemplary light screening apparatus when blocking light.
Figure 5:
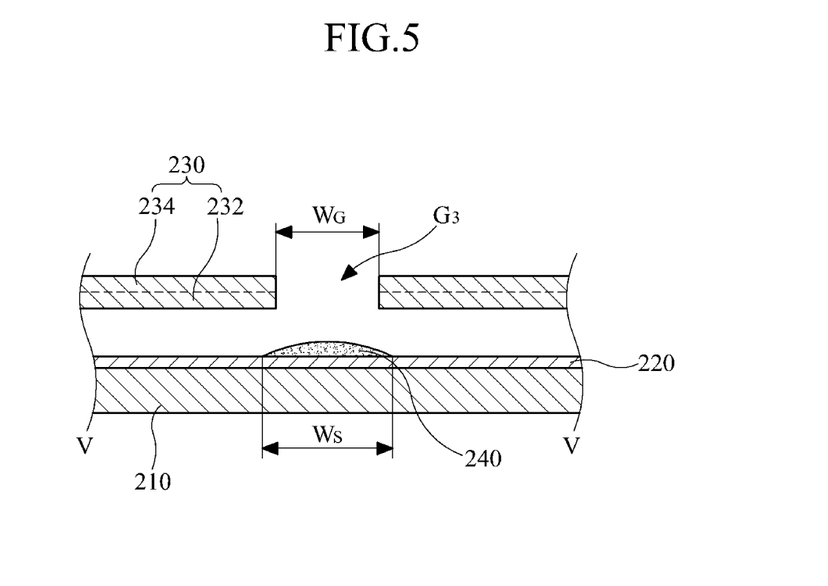
FIG. 5 shows a section cut along a V-V line of FIG. 4.
Figure 6:
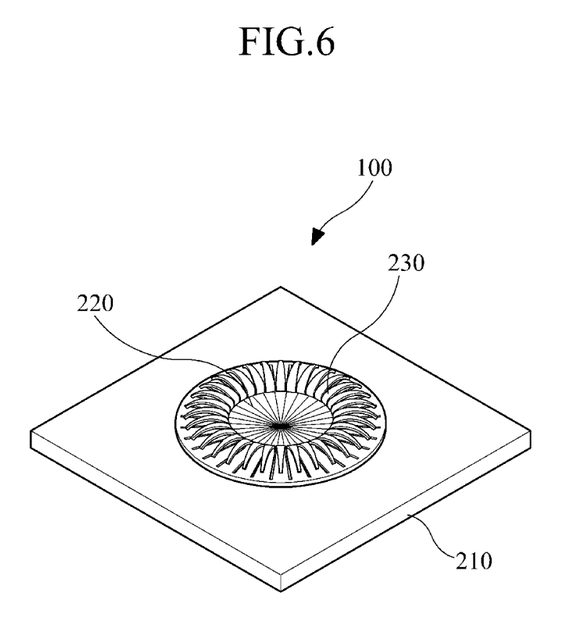
FIG. 6 is a perspective view of the light screening apparatus illustrated in FIG. 4, when passing light therethrough.

FIGS. 4, 5 and 6 are views for explaining another exemplary light screening apparatus 200. The light screening apparatus may be used as an optical shutter 200 for digital camera, etc, but is not limited to this. The light screening apparatus 200 is different from the light screening apparatus 100 illustrated in FIG. 1, in that the fixing ends of roll-up actuators are fixed on the circumference portion of a light-transmitting region in such a manner that the moving parts of the roll-up actuators extend in a radial shape from a center of the light-transmitting region to individually cover corresponding areas of the light-transmitting region. The following descriptions will focus on the differences between the light screening apparatus 200 and light screening apparatus 100.

FIG. 4 is a perspective view of the light screening apparatus 200 (an optical shutter) when blocking light, FIG. 5 shows a section cut along a V-V line of FIG. 4 and FIG. 6 is a perspective view of the optical shutter 200 illustrated in FIG. 4, when passing light therethrough. The embodiment described above with reference to FIGS. 1, 2 and 3 may correspond to an enlarged view of a part A of FIG. 4.

Referring to FIGS. 4, 5 and 6, the optical shutter 200 includes a substrate 210 having a light-transmitting region. The light-transmitting region may be manufactured in an arbitrary shape which includes a square, a circle, an oval and a polygon, however, is not limited to these. On the substrate 210, a transparent electrode 220 may be formed.

The optical shutter 200 includes a plurality of roll-up actuators 230. The fixing ends of roll-up actuators 230 are fixed on the substrate 210 while forming a circle, an oval or a regular polygon on the circumference portion of the-light transmitting region. When the roll-up actuators 230 are driven and thus their moving parts are flattened, the moving parts individually cover corresponding areas of the light-transmitting region in a radial shape from a center of the light-transmitting region, wherein in the case shown each roll-up actuator 230 is in a fan shape having a predetermined angle or in a triangle shape having a predetermined angle.

The roll-up actuators 230 are divided by gaps $G_3$ throughout the entire length of their moving parts or in predetermined portions of the moving parts. The gap $G_3$ may be formed between the fixing ends as well as between the moving parts. Alternatively, in order to avoid occurrence of mechanical coupling between neighboring roll-up actuators 230, no gap $G_3$ may be formed in the moving part portions adjacent to the fixing ends. Then, light screening patterns 240 are formed on substrate areas corresponding to the locations of the gaps $G_3$.

The optical shutter 200 having the above-described structure maintains, when no driving voltage is applied, a state where the moving parts of the roll-up actuators 230 are rolled up due to a difference in stress between an insulating layer 232 and an electrode layer 234, which is shown in FIG. 6. That is, the moving parts of the respective roll-up actuators 230 are rolled up away from the center of the light-transmitting region to expose the light-transmitting region of the substrate 210. When a driving voltage is applied between the transparent electrode 220 and the roll-up actuators 230, the moving parts are flattened to screen the light-transmitting region, thereby preventing light from being incident on the light-transmitting region. Light incident through the gaps $G_3$ is blocked by the light screening patterns 240 formed on the substrate 210.

Figure 7:
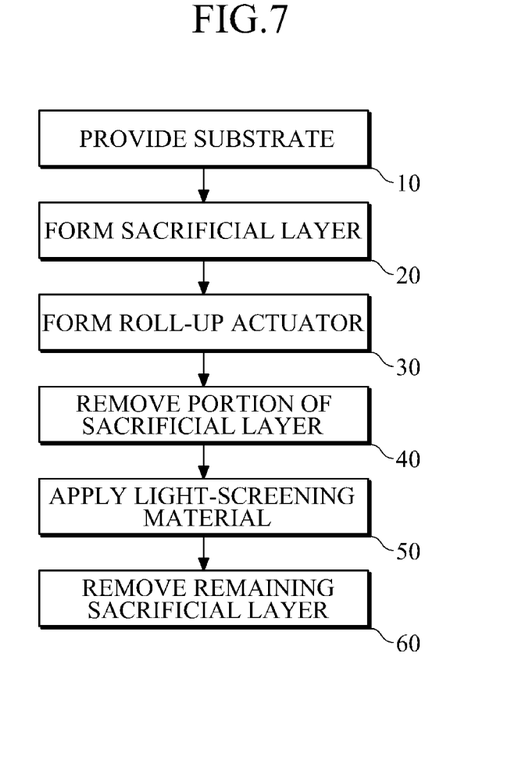
FIG. 7 is a flowchart of an exemplary method of manufacturing a light screening apparatus.

FIG. 7 is a flowchart of an exemplary method of manufacturing a light screening apparatus.

Referring to FIG. 7, the method of manufacturing a light screening apparatus includes: providing a light-transmitting substrate including a transparent electrode (operation 10); forming a sacrificial layer on the light-transmitting substrate (operation 20); forming a roll-up actuator on the substrate and the sacrificial layer (operation 30); patterning the sacrificial layer to form under-cuts below the roll-up actuator (operation 40); forming light screening patterns on the substrate using self alignment deposition (operation 50); and removing the remaining sacrificial layer (operation 60).

FIGS. 8 through 13 are views for sequentially explaining a method of manufacturing a light screening apparatus, wherein the light screening apparatus may be the light screening apparatus 100 illustrated in FIG. 1 or 2 or an enlarged structure of the part A of the optical shutter 200 illustrated in FIG. 6.

Figure 8:
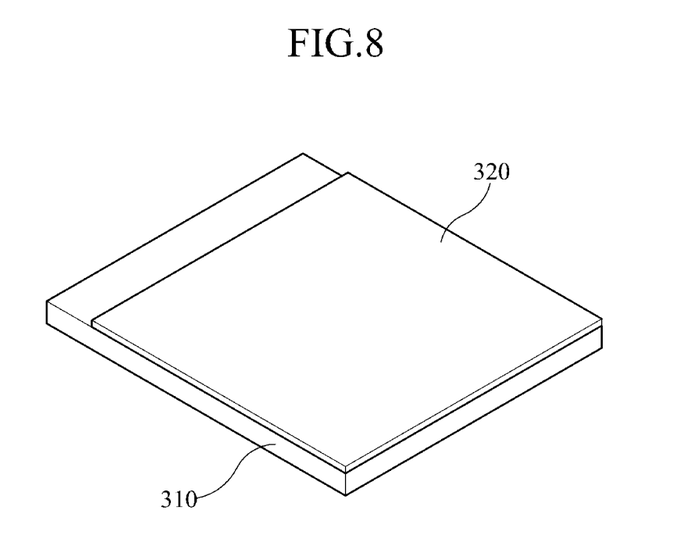
FIGS. 8 through 13 are views for sequentially explaining an exemplary method of manufacturing a light screening apparatus.

Referring to FIG. 8, first, a substrate 310 having a-light transmitting region is provided. The substrate 310 may be a glass substrate, but is not limited to this. On the substrate 310, more specifically, on the light-transmitting region, a transparent electrode 320 is formed. The substrate 310 on which the transparent electrode 320 has been formed in advance may be provided or the transparent electrode 320 may be formed on the substrate 310 through a separate semiconductor manufacturing process.

Figure 9:
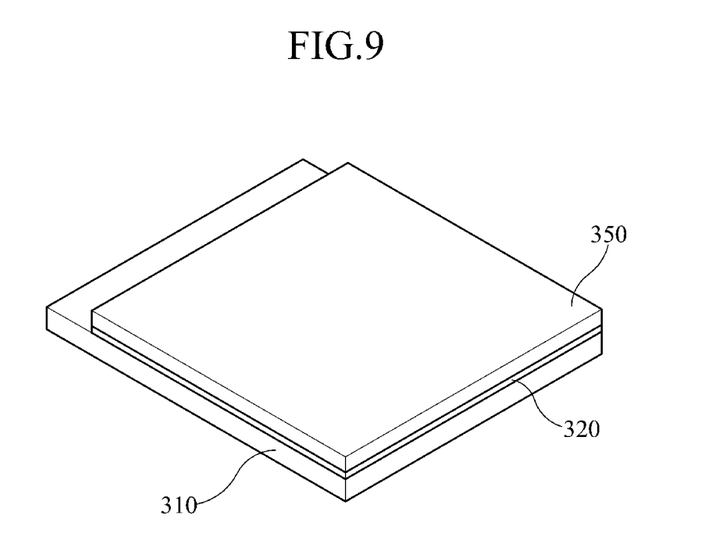

Then, referring to FIG. 9, a sacrificial layer 350 is formed on the transparent electrode 320. Since the sacrificial layer 350 will be removed after a roll-up actuator 230 is formed, the sacrificial layer 350 may be formed with a material having excellent etch selectivity with respect to the substrate 310, the transparent electrode 320 and the roll-up actuator 330 which are to be formed later. Alternatively, the sacrificial layer 350 may be formed with a material which can be easily removed. The sacrificial layer 350 may be formed on a predetermined portion of the substrate 310 while covering the light-transmitting region of the substrate 310. In this case, no sacrificial layer 350 is formed outside one side of the light-transmitting region, that is, on an area of the substrate on which the fixed end of the roll-up actuator 330 will be placed.

Figure 10:
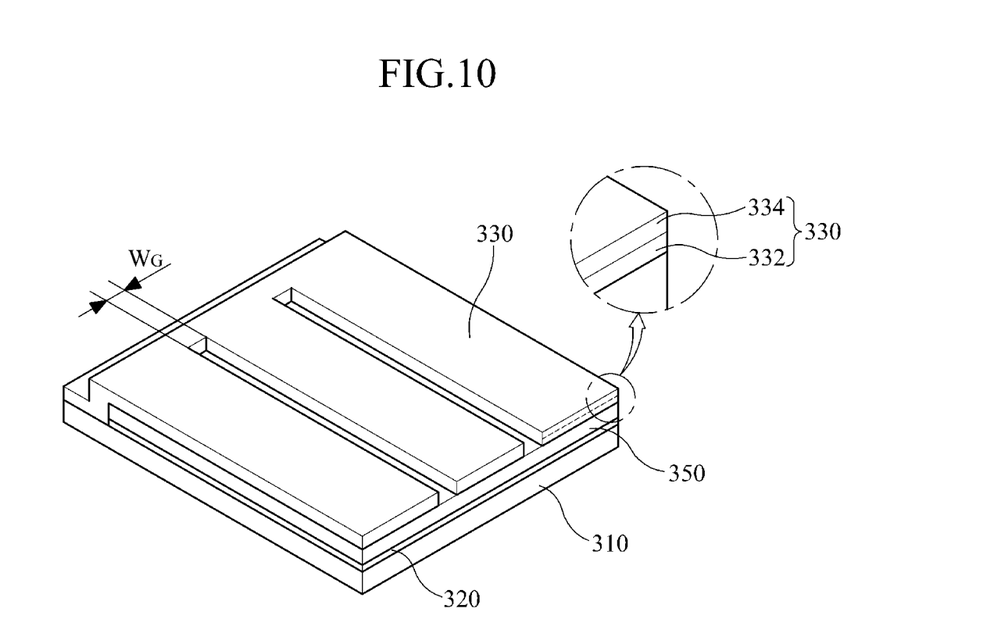

Referring to FIG. 10, the roll-up actuator 330 is formed on the resultant structure of FIG. 9, more specifically, on the substrate 310 and the sacrificial layer 350. The roll-up actuator 350 may be a structure including two thin films of an insulating layer 332 and an electrode layer 334 formed thereon. The portion of the roll-up actuator 350 formed on the substrate 310 may become a fixing end, and the remaining portion of the roll-up actuator 350 formed on the light-transmitting layer may become a moving part. As a result, a predetermined step height is made between the fixing end and moving part of the roll-up actuator 330. The entire or portion of the moving part of the roll-up actuator 330 is divided into a plurality of areas separated by gaps each having a predetermined width $W_G$.

Various methods may be used to form the roll-up actuator 330 having the structure described above. For example, the roll-up actuator 330 may be formed by sequentially forming an insulating layer and an electrode layer on the substrate 310 and the sacrificial layer 350 and then patterning the insulating layer and the electrode layer using a predetermined etching process.

Figure 11:
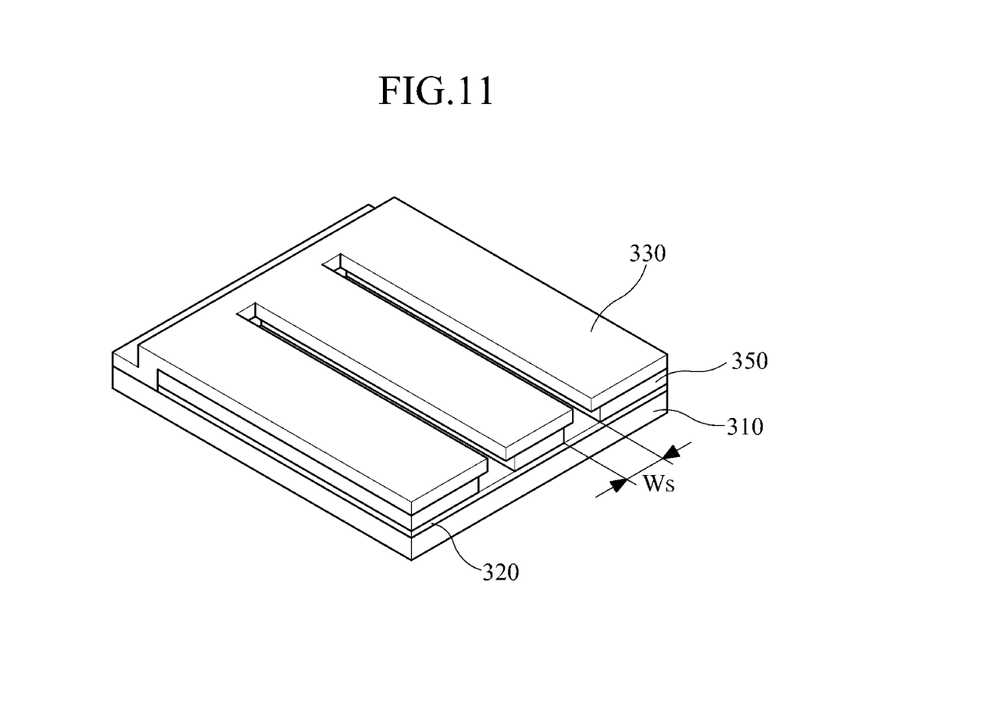

Then, as illustrated in FIG. 11, etching is performed on the sacrificial layer 350 to partially expose the substrate 310 or transparent electrode 320. Since light screening patterns 340 will be formed on the exposed portions, the pattern of the sacrificial layer 350 defines the shape of the light screening patterns 340. A photomask used to form the roll-up actuator 330 is used as it is in the process of etching the sacrificial layer 350.

In this case, by etching areas corresponding to gaps between the moving parts of the roll-up actuator 330, that is, the sacrificial layer portions 350 exposed by the gaps and partially etching the sacrificial layer portions 350 below the roll-up actuator 330, under-cuts may be formed below the roll-up actuators 330. If such under-cuts are not formed, when the light screening patterns 340 are formed in the following process, a material for forming the light screening patterns 340 may reach the roll-up actuator 330 along the side walls of the sacrificial layer 350. The under-cuts prevent such a phenomenon from occurring. Also, by forming the under-cuts, the width of each light screening pattern 340 becomes wider than that of a gap between the roll-up actuators 330.

Figure 12:
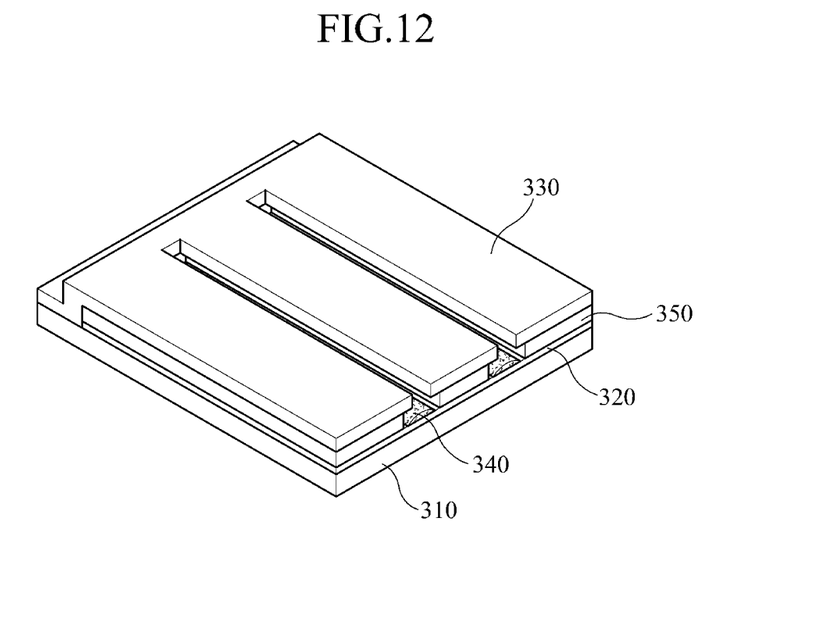

Then, as shown in FIG. 12, the light screening patterns 340 are formed on the exposed substrate 310 or transparent electrode 320. The light screening patterns 340 may be formed using deposition which is generally used in the related field. The deposition may be self alignment deposition in which a photomask used in the process of etching the sacrificial layer 350 is used as it is. In the case of using self alignment deposition, light screening patterns 340 can be accurately aligned and the frequency in use of a photomask can be reduced, which leads to reduction of manufacturing costs. By performing the deposition, light screening patterns 340 each having a predetermined width Ws are formed on the substrate 310 or transparent electrode 320.

Figure 13:
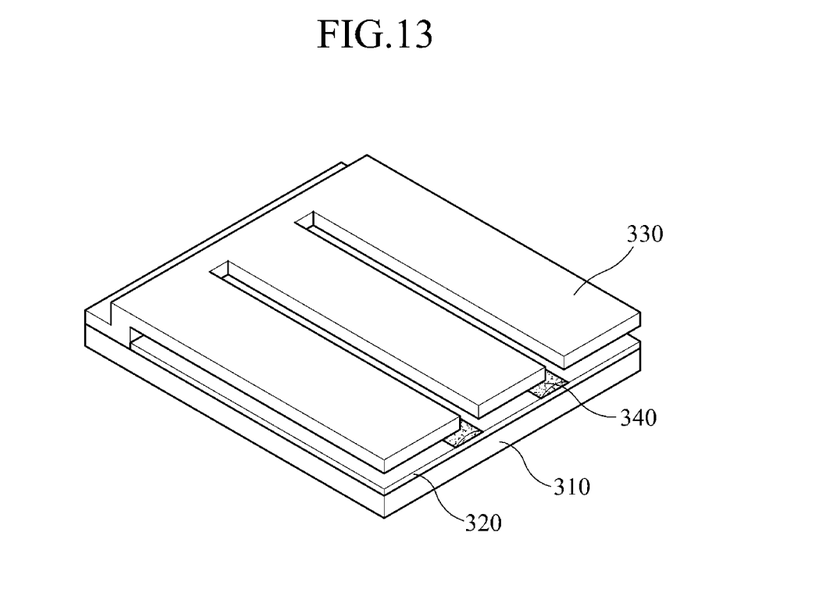

Referring to FIG. 13, a process of removing the sacrificial layer 350 from the structure shown in FIG. 12 is performed. By removing the sacrificial layer 350, the fixing ends contact the edge portion of the substrate 310, and the roll-up actuators 330 are separated by a predetermined interval from the transparent electrode 320. The resultant light screening apparatus may have a thickness of 1 mm or less.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A light screening apparatus comprising:
   a substrate comprising a light-transmitting region and a non-light-transmitting region;
   a transparent electrode formed on a surface of the substrate;
   a plurality of opaque roll-up actuators disposed on the transparent electrode, such that a first portion of each of the plurality of roll-up actuators is fixedly attached to the non-light-transmitting region and a second portion of each of the plurality of roll-up actuators is moveable with respect to the substrate; and
   a plurality of light screening patterns formed on the substrate;
   wherein each of the roll-up actuators is moveable between a first position and a second position, wherein, in the first position, each of the plurality of roll-up actuators overlaps a portion of the light-transmitting region with gaps between the plurality of roll-up actuators corresponding to the plurality of light screening patterns.

2. The light screening apparatus of claim 1, wherein a width of each of the plurality of light screening patterns is equal to or wider than a width of a corresponding one of the gaps.

3. The light screening apparatus of claim 1, wherein the light screening patterns are formed on the transparent electrode.

4. The light screening apparatus of claim 1, wherein the first portion of each of the plurality of roll-up actuators is a fixing end and the second portion of each of the plurality of roll-up actuators is a moving part, and portions of the moving parts of the plurality of roll-up actuators are connected to each other adjacent to the fixing ends.

5. The light screening apparatus of claim 1, wherein each of the plurality of roll-up actuators comprises an insulating layer and an upper electrode formed on the insulating layer.

6. The light screening apparatus of claim 5, wherein the insulating layer and the upper electrode have different residual stresses.

7. The light screening apparatus of claim 6, wherein the upper electrode has a tensile residual stress, and the insulating layer has a compressive residual stress, no residual stress, or a tensile residual stress lower than the tensile residual stress of the upper electrode layer.

8. The light screening apparatus of claim 5, wherein the plurality of roll-up actuators are driven by electrostatic force generated between the transparent electrode and the upper electrode.

9. A light screening apparatus comprising:
   a substrate comprising a light-transmitting region in a shape of a circle or a polygon;
   a transparent electrode formed on a surface of the substrate;
   a plurality of opaque roll-up actuators disposed on the substrate and the transparent electrode, wherein each of the plurality of roll-up actuators comprises:
      a first portion which is fixedly attached to a portion of the substrate radially outside of the circumference of the light-transmitting region, and a second portion which extends radially inward over the transparent electrode and which is moveable with respect to the substrate; and
   a plurality of light screening patterns formed on the substrate;
   wherein each of the plurality of roll-up actuators is moveable between a first position and a second position, wherein, in the first position, each of the plurality of roll-up actuators overlaps a portion of the light-transmitting region with gaps between the plurality of roll-up actuators corresponding to the plurality of light screening patterns.

10. The light screening apparatus of claim 9, wherein a width of each of the plurality of light-screening patterns is equal to or wider than a width of a corresponding one of the gaps.

11. The light screening apparatus of claim 9, wherein the first portion of each of the plurality of roll-up actuators is a fixing end and the second portion of each of the plurality of roll-up actuators is a moving part, and the fixing ends are arranged in a form of a circle or a polygon around the circumference of the light-transmitting region, and the moving parts each have a fan shape or a triangle shape.

12. The light screening apparatus of claim 11, wherein portions of the moving parts are connected to each other adjacent to the fixing ends of the roll-up actuators.

13. The light screening apparatus of claim 9, wherein each of the plurality of roll-up actuators comprises an insulating layer and a upper electrode formed on the insulating layer, and wherein the insulating layer and the upper electrode have different residual stresses.

14. The light screening apparatus of claim 13, wherein the upper electrode has a tensile residual stress, and the insulating layer has a compressive residual stress, no residual stress, or a tensile residual stress lower than the tensile residual stress of the upper electrode layer.

15. A light screening apparatus comprising:
   a substrate comprising a light-transmitting region;
   a transparent electrode formed on a surface of the substrate; and a plurality of opaque roll-up actuators disposed on the transparent electrode and the substrate, wherein each of the plurality of roll-up actuators comprises a fixing end fixedly attached to the substrate and a moving part which is moveable with respect to the substrate between a first position and a second position;

wherein, in the first position, each of the plurality of roll-up actuators overlaps a portion of the transparent electrode and the light-transmitting region; and wherein portions of the moving parts are connected to each other adjacent to the fixing ends.

16. The light screening apparatus of claim 15, wherein, in the first position, the moving parts are separated from each other by gaps each having a predetermined width, and wherein the light screening apparatus further comprises a plurality of light screening patterns formed on the substrate at locations corresponding to the gaps.

17. The light screening apparatus of claim 15, wherein each of the plurality of roll-up actuator comprises an insulating layer and a upper electrode formed on the insulating layer, wherein the insulating layer and the upper electrode have different residual stresses.

18. The light screening apparatus of claim 17, wherein the roll-up actuators are driven by electrostatic force generated between the transparent electrode and the upper electrode.

* * * * *